United States Patent
Castillo

(10) Patent No.: US 12,409,897 B2
(45) Date of Patent: Sep. 9, 2025

(54) INSULATING LOAD DISTRIBUTING SKID PLATE

(71) Applicant: GM GLOBAL TECHNOLOGY OPERATIONS LLC, Detroit, MI (US)

(72) Inventor: Brian V. Castillo, Birmingham, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 196 days.

(21) Appl. No.: 18/194,687

(22) Filed: Apr. 3, 2023

(65) Prior Publication Data

US 2024/0326926 A1  Oct. 3, 2024

(51) Int. Cl.
*B62D 25/20* (2006.01)
*B32B 5/18* (2006.01)
*B32B 15/04* (2006.01)

(52) U.S. Cl.
CPC ............ *B62D 25/2072* (2013.01); *B32B 5/18* (2013.01); *B32B 15/046* (2013.01); *B32B 2250/02* (2013.01); *B32B 2305/022* (2013.01); *B32B 2307/304* (2013.01); *B32B 2307/558* (2013.01); *B32B 2605/00* (2013.01)

(58) Field of Classification Search
CPC ............ A61K 36/185; A61K 8/9789; A61K 2121/00; A61P 1/00; A61P 1/04; A61P 11/02; A61P 11/06; A61P 17/00; A61P 17/04; A61P 17/06; A61P 17/10; A61P 29/00; A61P 37/08; A61P 39/00; A61Q 19/00; A61Q 19/008; B32B 15/046; B32B 15/18; B32B 15/20; B32B 2250/02; B32B 2305/022; B32B 2307/304; B32B 2307/558; B32B 2605/00; B32B 27/065; B32B 5/18; B32B 5/245; B32B 5/32; B32B 7/12; B62D 25/2072
See application file for complete search history.

(56) References Cited

U.S. PATENT DOCUMENTS

| 2004/0247857 | A1* | 12/2004 | Schroeder | ................. B32B 5/18 428/319.1 |
| 2014/0147717 | A1* | 5/2014 | Sundararajan | ......... B62D 21/02 429/100 |
| 2021/0214021 | A1* | 7/2021 | Aitharaju | ................. B60K 1/04 |

* cited by examiner

*Primary Examiner* — Hai Vo
(74) *Attorney, Agent, or Firm* — Quinn IP Law

(57) ABSTRACT

A skid plate for a vehicle includes a first layer, including a first material and a second layer, including a second material, which may be different from the first material. The second layer may be attached or bonded to the first layer and may convert a concentrated load into a distributed load. The second layer may provide thermal insulation for at least one underbody component of the vehicle. For example, the first layer may be metallic, while the second layer may be a rigid foam. The rigid foam may include an expanding adhesive foam. An adhesive may be disposed between the first layer and the second layer, to attach or bond the first layer to the second layer. The second layer may be adjacent to at least one underbody component of the vehicle. The concentrated load may correspond with a contact to the first layer of the skid plate.

8 Claims, 4 Drawing Sheets

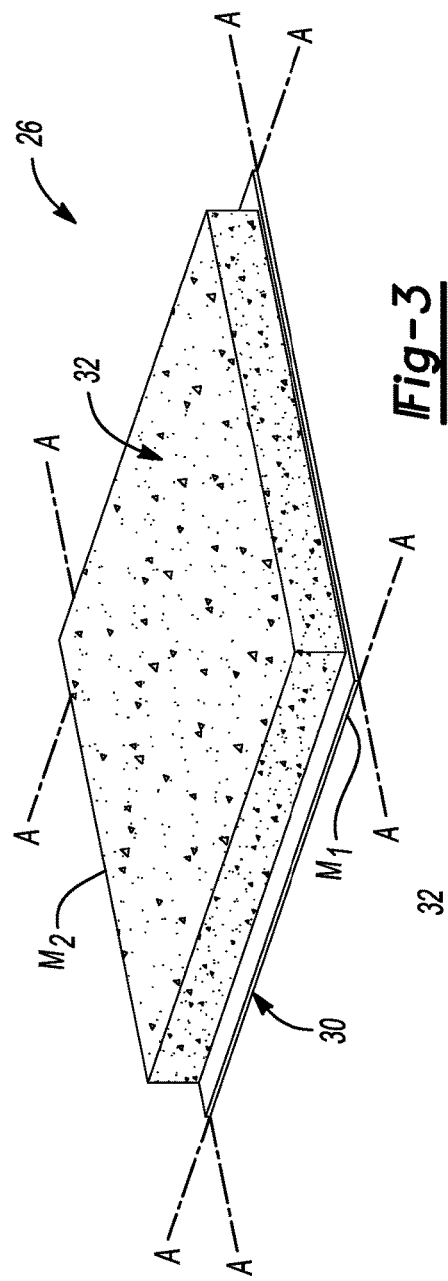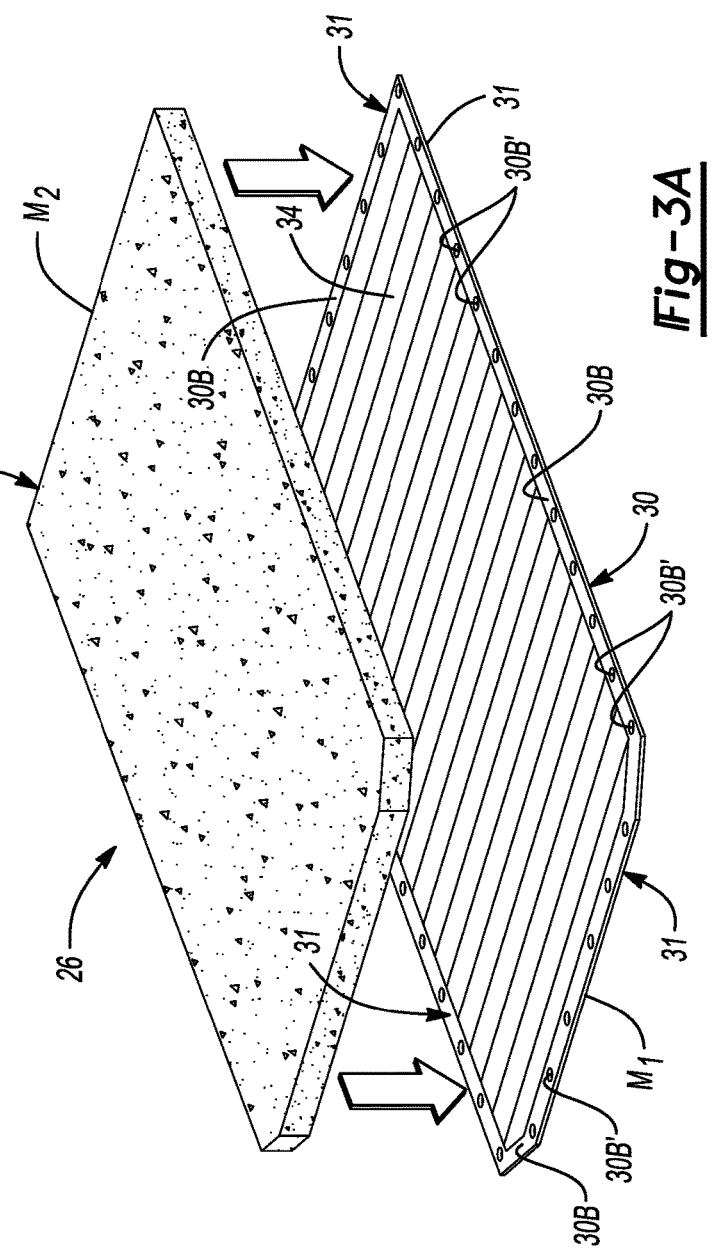

INSULATING LOAD DISTRIBUTING SKID PLATE

TECHNICAL FIELD

The present disclosure generally relates to skid plates and, more particularly, to an insulating skid plate that distributes a concentrated load to protect underbody components of a vehicle.

BACKGROUND

Vehicles, for example, cars, trucks, motorcycles and off-road vehicles, include underbody components, for example, fuel tanks, differentials, transmissions, transfer cases, and/or batteries, which are installed within an undercarriage of the vehicle. These underbody components are susceptible to physical damage from objects, for example, rocks and/or other road or off-road debris, which may contact the undercarriage of the vehicle, possibly causing physical damage to the underbody components, during vehicle operation.

Some of these vehicle underbody components may also require underbody thermal protection. For example, a propulsion battery pack installed within an undercarriage of a vehicle, may require thermal conditioning or "cooling." to assist in protecting the propulsion battery pack from heat that may be radiated from a road surface in warmer weather, for example, in summer, and/or thermal insulating, to assist in preventing heat loss in cooler weather, for example, in winter.

Skid plates are installed beneath a vehicle between the underbody components and a driving surface to protect the underbody components. However, traditional skid plates commonly utilize a metal plate or similar structure of sufficient strength and rigidity to absorb loads, such as contact loads, in a concentrated fashion, which may create deformations in the skid plate, and possibly damage the vehicle underbody components.

Traditional skid plates may include an airgap between the skid plate and the vehicle underbody components and/or pre-formed supports to minimize possible physical damage to the underbody vehicle components and distribute the concentrated loads. However, both configurations may trap debris between the skid plate and the vehicle underbody components, possibly causing physical damage to the vehicle underbody components, while only minimally distributing concentrated loads. Additionally, neither configuration provides thermal protection.

SUMMARY

It is therefore useful to develop a skid plate that may provide greater load distributing physical protection for underbody components located in the undercarriage of vehicle, to minimize and/or prevent damage to the undercarriage components.

It is also useful to develop a skid plate that may also provide thermal insulation for underbody components, for example, a propulsion battery pack used in electric and/or hybrid vehicles, which requires thermal conditioning, to minimize the energy consumed in heating and/or cooling the battery, effectively improving vehicle range and/or efficiency.

In one aspect of the present disclosure, a skid plate for a vehicle includes a first layer, including a first material and a second layer, including a second material, which may be different from the first material. The second layer may be attached or bonded to the first layer and may convert a concentrated load into a distributed load. The second layer may provide thermal insulation for the at least one underbody component of the vehicle. For example, the first layer may be metallic, while the second layer may be a rigid foam. The rigid foam may include an expanding adhesive foam.

An adhesive may be disposed between the first layer and the second layer, to attach or bond the first layer to the second layer.

The second layer may be adjacent to the at least one underbody component of the vehicle.

The concentrated load may correspond with a contact to the first layer of the skid plate. When the concentrated load exceeds a predetermined load, the second layer may be compressible to absorb energy generated by a contact to the first layer of the skid plate.

The second layer may include a thickness such that when the first layer includes a deformation, the thickness of the second layer may provide a buffer between the deformation of the first layer and the at least one underbody component of the vehicle.

The at least one underbody component of the vehicle may include a propulsion battery pack.

In one aspect of the present disclosure, a skid plate for a vehicle having an underbody may include a first layer; and a second layer, bonded to the first layer to form the skid plate, which may be connected to the underbody of the vehicle. The first layer may be constructed from a first material and the second layer may be constructed from a second material, different from the first material. For example, the first layer may be metallic, while the second layer may be a rigid foam. The rigid foam may include an expanding adhesive foam.

The vehicle may include one or more underbody components connected to the underbody. The second layer may provide thermal insulation for at least one of the one or more underbody components of the vehicle.

The second layer may convert a concentrated load into a distributed load.

The second layer may conform to at least one underbody component of the vehicle. A concentrated load, applied to the first layer, may be converted, by the second layer, into a distributed load applied to the at least one underbody component.

In another aspect of the present disclosure, a method of providing a skid plate for a vehicle may include: providing a first layer of the skid plate, including a first material; providing a second layer of the skid plate, including a second material, wherein the second layer is bonded to the first layer; installing the skid plate between at least one underbody component of the vehicle and a driving surface, such that second layer of the skid plate may convert a concentrated load, applied to the first layer, into a distributed load.

Providing a first layer may include providing a first layer that may be metallic.

Providing a second layer may include providing a second layer that may be a rigid foam. The provided second layer may provide thermal insulation for at least one underbody component of the vehicle.

The provided second layer may have a thickness that may provide a buffer between a deformation of the first layer and the at least one underbody component of the vehicle.

The method of providing a skid plate for a vehicle may include compressing the second layer to absorb energy associated with a contact to the first layer when the concentrated load exceeds a predetermined load.

Installing the skid plate between at least one underbody component and a driving surface may include installing the skid plate such that the second layer may be adjacent to and/or conform to the at least one underbody component.

Accordingly, the presently disclosed skid plate provides greater load distributing physical protection for underbody components located in the undercarriage of a vehicle, to minimize and/or prevent damage to the underbody components.

The presently disclosed skid plate also provides thermal insulation for underbody components of the vehicle, for example, a propulsion battery pack used in electric and/or hybrid vehicles, which requires thermal conditioning, to minimize the energy consumed in heating and/or cooling the battery, effectively improving vehicle range and/or efficiency.

The above features and advantages and other features and advantages of the present teachings are readily apparent from the following detailed description of the modes for carrying out the present teachings when taken in connection with the accompanying drawings.

BRIEF DESCRIPTION OF THE DRAWINGS

The accompanying drawings, which are incorporated into and constitute a part of this specification, illustrate implementations of the disclosure and, together with the description, serve to explain the principles of the disclosure.

FIG. 3 is a schematic illustration of section a skid plate, shown as A in FIG. 2.

FIG. 3A is an exploded schematic illustration of a skid plate.

DETAILED DESCRIPTION

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Figure 1:
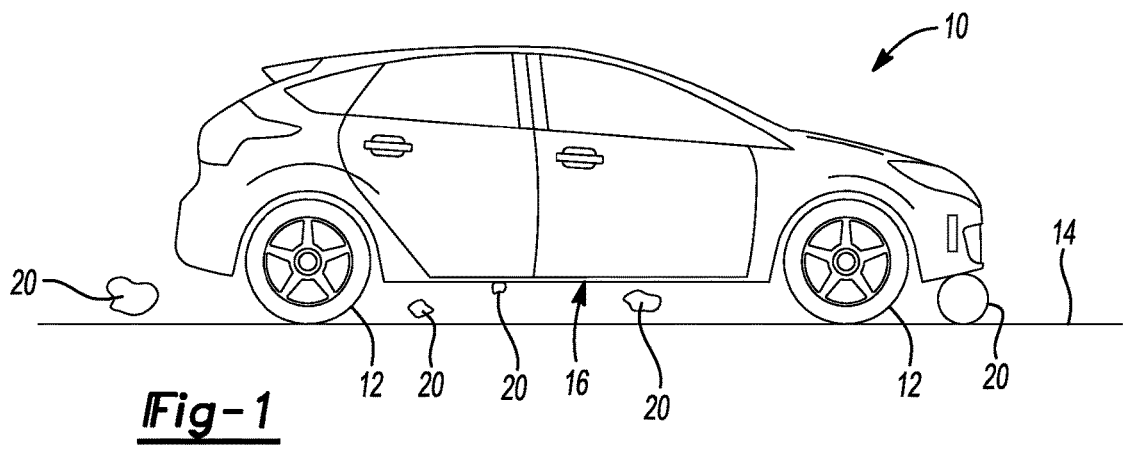
FIG. 1 is a schematic side view illustration of a vehicle on a driving surface.

With reference to FIG. 1, a vehicle 10 having tires 12 is located on a driving surface 14, for example, but not limited to, a road. The vehicle 10 includes an underbody 16. Underbody components 18 (FIG. 2) are disposed within the underbody 16 of the vehicle 10.

Figure 5:
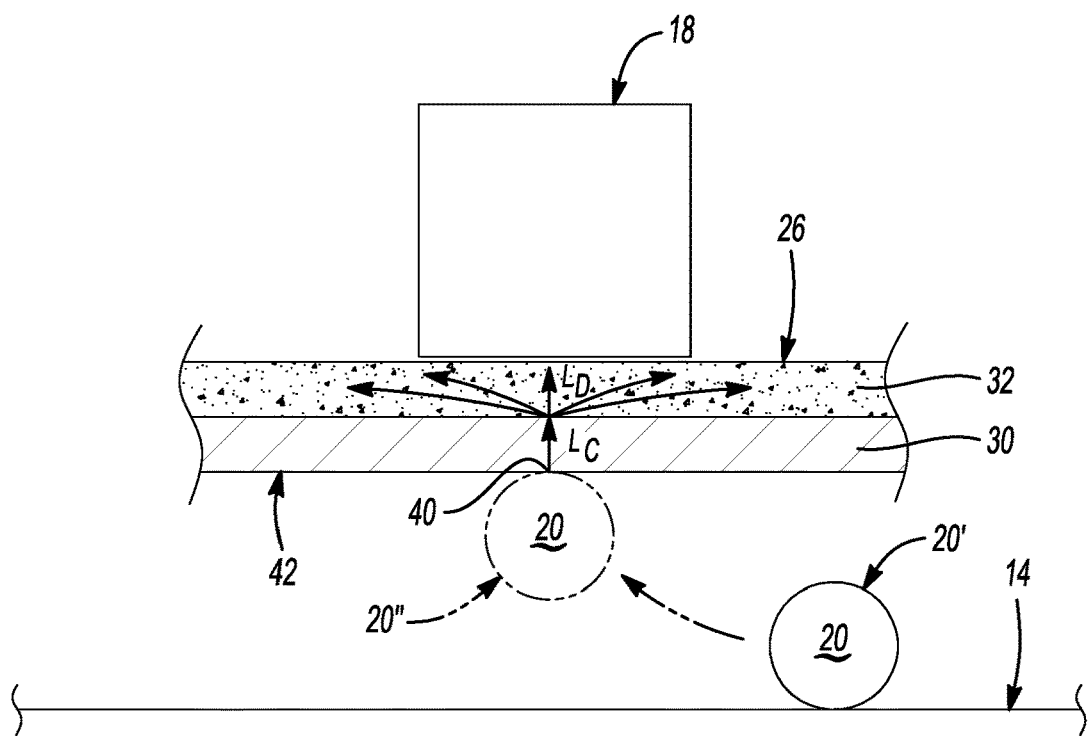
FIG. 5 is a schematic illustration of a section of skid plate being contacted by debris.

As the vehicle 10 travels along the driving surface 14, various debris 20, for example, rocks and/or road debris, may be picked up by the tires 12 and directed towards the underbody 16, contacting the underbody components 18 causing physical damage to the underbody components 18. This "contact" creates a concentrated load $L_C$ where the debris 20 contacts the underbody 16 (FIG. 5). While smaller debris 20 are illustrated as being directed towards the underbody 16, it should be appreciated that larger debris 20 may also contact the underbody 16, for example, if the vehicle 10 would happen to run over, for example, a large rock or curb.

Figure 2:
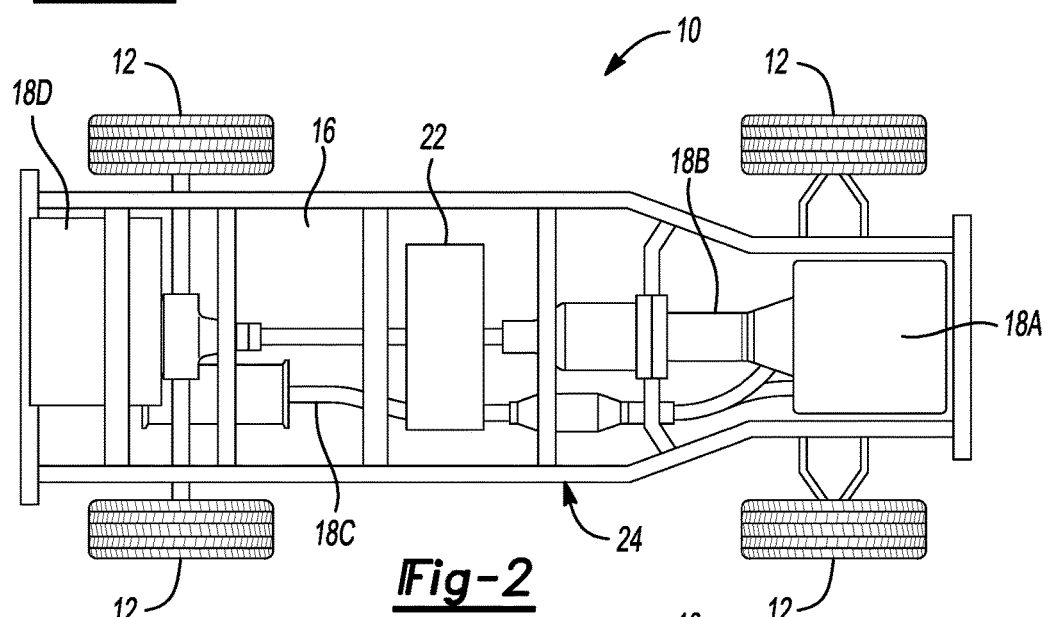
FIG. 2 is a schematic bottom view illustration of a vehicle undercarriage.

With reference to FIG. 2, a vehicle 10 includes an underbody 16 having a frame 24. Underbody components 18 include engine 18A, transmission 18B, exhaust system 18C, and fuel tank 18D, which are disposed within the underbody 16 of the vehicle 10. While the illustrated vehicle 10 includes frame 24, it should be appreciated that the vehicle 10 may also include a unibody construction.

When the vehicle 10 is an electric or hybrid electric vehicle, a propulsion battery pack, schematically illustrated at 22, may also be included within the underbody of the vehicle 10. While the illustrated underbody components 18 include engine 18A, transmission 18B, exhaust system 18C, fuel tank 18D, and propulsion battery pack 22, it should be appreciated that these are exemplary and underbody components 18 may include other components that may be potentially located within the underbody 16 of a vehicle 10.

Figure 2A:
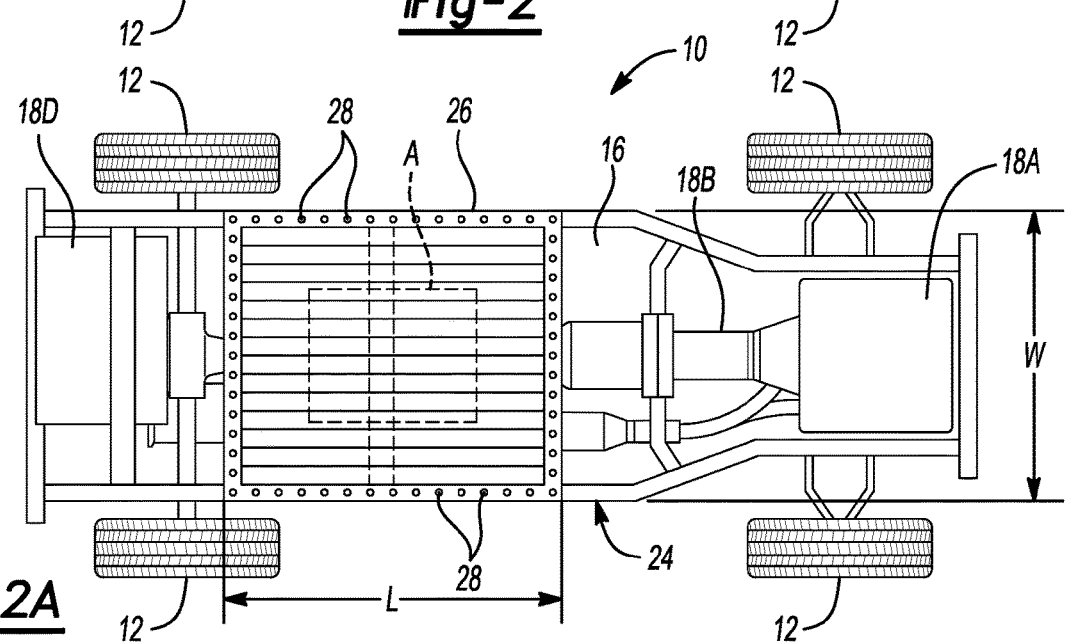
FIG. 2A is a schematic bottom view illustration of a vehicle undercarriage including a skid plate.

With reference to FIG. 2A, and continued reference to FIG. 2, a skid plate 26 is connected to an underbody 16 including a frame 24 of a vehicle 10 using a plurality of fasteners 28.

The skid plate 26 has an overall length L and an overall width W, which are configured to protect at least one underbody component 18. It should be appreciated, however, that the overall length L and the overall width W of the skid plate 26, may be configured to protect more than one underbody component 18.

In one aspect of the present disclosure, as illustrated in FIG. 3, with continued reference to FIGS. 1-2A, a skid plate 26 for a vehicle 10 includes a first layer 30 including a first material $M_1$ and a second layer 32, including a second material $M_2$, which may be different from the first material $M_1$. The second layer 32 is bonded to the first layer 30 and converts a concentrated load $L_C$ into a distributed load $L_D$. The second layer 32 provides thermal insulation for at least one underbody component 18 of the vehicle 10 (FIG. 5).

In the illustrated embodiment, the first material $M_1$ of the first layer 30 is a metal, which may but is not limited to, a stamped steel. The second material $M_2$ of the second layer 32 is a rigid foam, for example, but not limited to, an extruded polystyrene, such as a high-density extruded polystyrene (XPS) foam or an extruded polyurethane. The rigid foam may include an expanding adhesive foam.

As illustrated in FIG. 3A, with continued reference to FIG. 3, an adhesive 34 may be disposed between the first layer 30 and the second layer 32, to attach or bond the first layer 30 to the second layer 32.

The first layer 30 includes mounting flanges 30B along edges 31 of the first layer 30. The mounting flanges 30B define openings 30B' for receiving fasteners 28 (FIG. 2A) for connection to a frame 24 of a vehicle 10. While the illustrated vehicle 10 includes frame 24, it should be appreciated that the vehicle 10 may also include a unibody construction and the skid plate 26 may be connected to the unibody of the vehicle 10, or otherwise fixedly connected to the underbody 16 of the vehicle 10.

Figure 4:
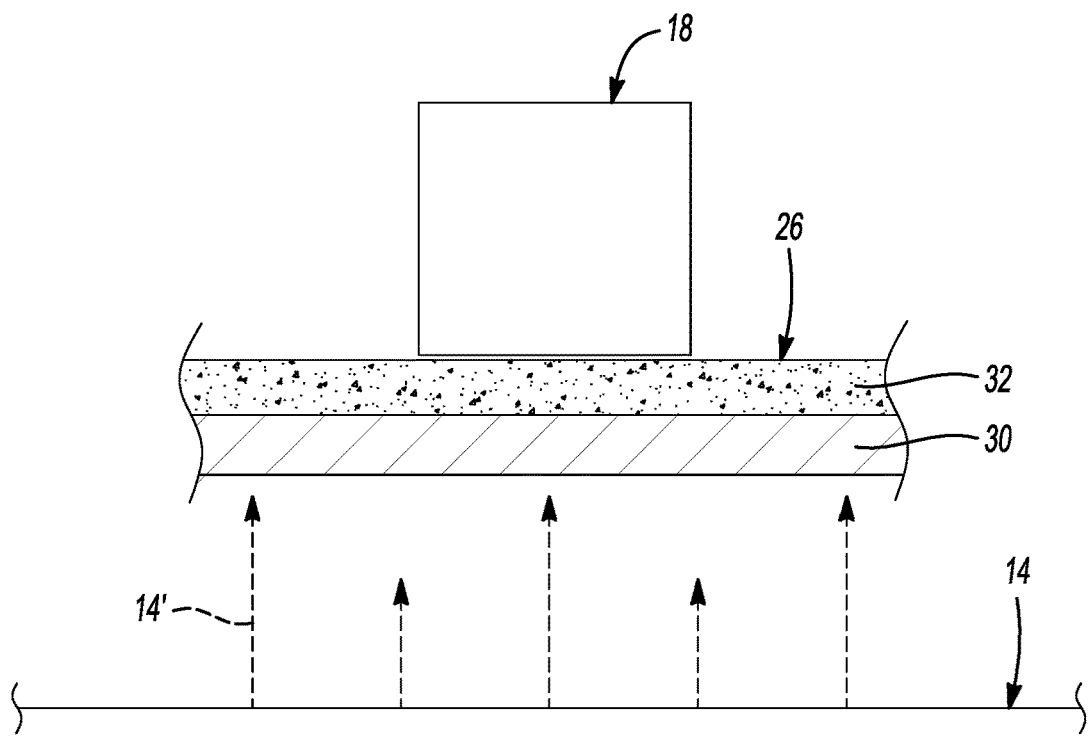
FIG. 4 is a schematic illustration of a section of skid plate including an underbody component.

As illustrated in FIG. 4, a second layer 32 is adjacent to the at least one underbody component 18 of the vehicle 10. In warmer weather, such as in summer, heat 14' radiates upward from the driving surface 14, for example an asphalt road. As the second layer 32 is a rigid foam, the second layer 32 provides thermal insulation for at least one underbody component 18 of the vehicle 10 (FIG. 2A). As some underbody components 18, for example, a propulsion battery pack for an electric vehicle and/or hybrid electric vehicle, requires thermal conditioning or "cooling," the thermal insulation provided by the second layer 32 of the skid plate may minimize an amount of cooling required for the propulsion battery pack 18, providing a greater electric vehicle range, while potentially reducing cost and weight.

Further, while heat 14' is illustrated as radiating upward from the driving surface 14 during warmer weather, it should be appreciated that in cooler weather, such as in winter, the driving surface 14 may be cold or even frozen, generating cold air between the skid plate 26 and the driving surface 14. When the underbody component 18 includes a propulsion battery pack for an electric vehicle and/or a hybrid electric vehicle, the thermal insulation provided by the second layer 32 of the skid plate 26 for the propulsion battery pack 18, reduces heat loss from the propulsion battery pack 18, again, providing a greater electric vehicle range.

As illustrated in FIG. 5, when debris 20 travels from position 20' on a driving surface 14 to position 20" where the debris 20 contacts a bottom surface 42 of a first layer 30 of a skid plate 26, the contact of the debris 20 creates a concentrated load $L_C$ at a location of contact 40, which corresponds with the contact of the debris 20 to the bottom surface 42 of the first layer 30.

A second layer 32 converts the concentrated load $L_C$ into a distributed load $L_D$, which is distributed throughout the second layer 32. The concentrated load $L_C$ may be considered a high-stress load, while the distributed load $L_D$ may be considered a low-stress load.

As the second layer 32 conforms to at least one underbody component 18 of the vehicle 10, the concentrated load $L_C$, applied to the first layer 30, converted by the second layer 32 into a distributed load $L_D$, results in the distributed load $L_D$ reacting against the underbody component 18.

Figure 5A:
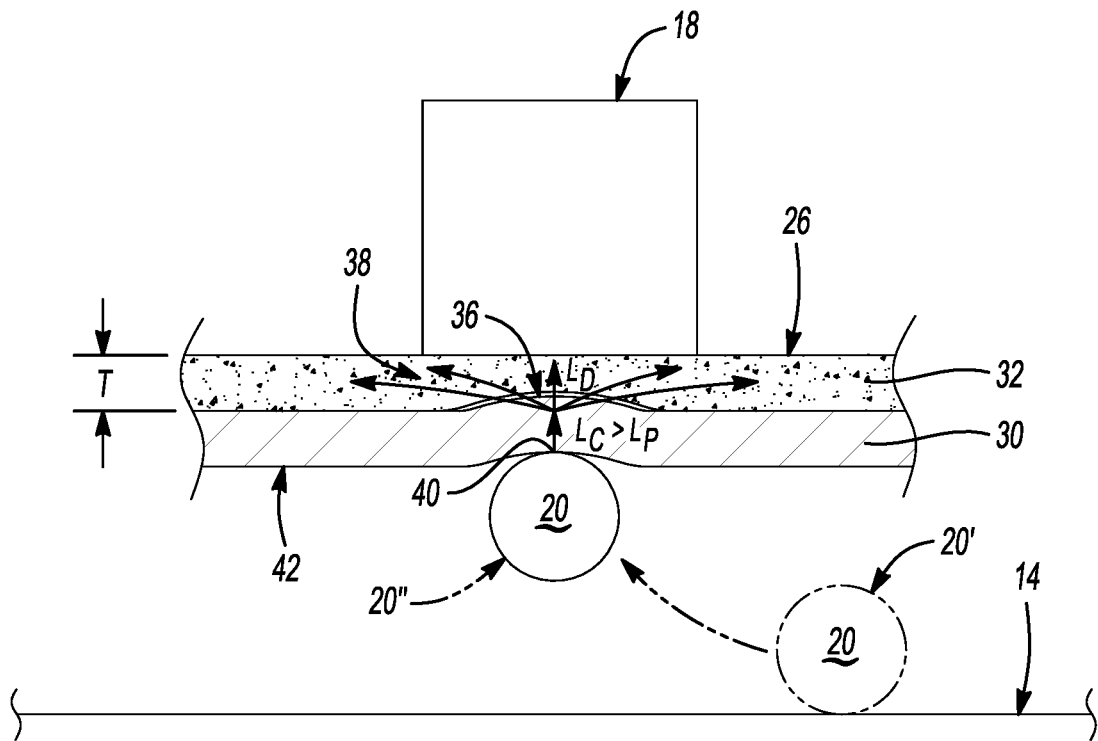
FIG. 5A is a schematic illustration of a section of skid plate being contacted by debris and including a deformation.

As illustrated in FIG. 5A, in the event of "abuse loads" when a concentrated load $L_C$ exceeds a predetermined load $L_D$, a second layer 32 serves to absorb energy through compressive failure, i.e. the secondary layer 32 is compressible to absorb energy corresponding with a contact of a debris 20 to a bottom surface 42 a first layer 30, providing additional protection to the underbody component 18.

When the concentrated load $L_C$ exceeds the predetermined load $L_D$ and a deformation 36 in a first layer 30 is formed by the contact of the debris 20. The second layer 32 includes a thickness T such that when the first layer 30 includes the deformation 36, the thickness T of the second layer 32 provides a buffer 38 between the deformation 36 of the first layer 30 and the at least one underbody component 18 of the vehicle 10.

In one aspect of the present disclosure, as illustrated in FIGS. 1, 3 5 and 5A, a skid plate 26 for a vehicle 10 having an underbody 16 includes a first layer 30 and a second layer 32, bonded to the first layer 30, to form the skid plate 26 connected to the underbody 16 of the vehicle 10.

The first layer 30 is constructed from a first material $M_1$ and the second layer 32 is constructed from a second material $M_2$, different from the first material $M_1$.

The vehicle 10 includes one or more underbody components 18 connected to the underbody 16. The second layer 32 provides thermal insulation for the one or more underbody components 18 of the vehicle 10.

The second layer 32 converts a concentrated load $L_C$ into a distributed load $L_D$.

The second layer 32 conforms to one or more underbody components 18 of the vehicle 10. A concentrated load $L_C$, applied to the first layer 30, is converted, by the second layer, into a distributed load $L_D$.

In one aspect of the present disclosure, as illustrated in FIGS. 1, 2, 5 and 5A, a skid plate 26 for a vehicle 10 includes a first layer 30, including a first material $M_1$ and a second layer 32, including a second material $M_2$, which may be different from the first material $M_1$. The second layer 32 is bonded to the first layer 30 and converts a concentrated load $L_C$ into a distributed load $L_D$. The second layer 32 provides thermal insulation for at least one underbody component 18 of the vehicle 10.

Figure 6:
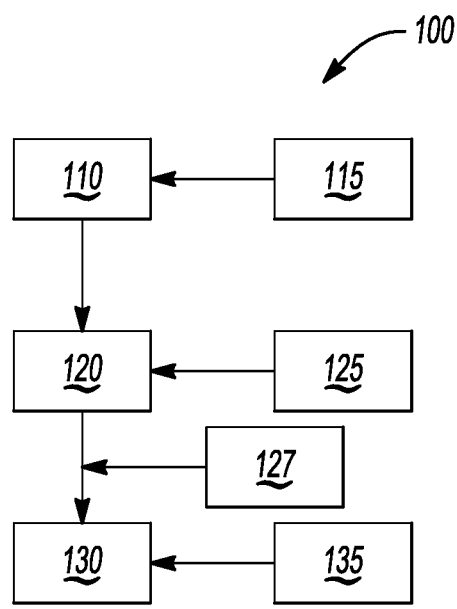
FIG. 6 is a flow chart illustrating a method of providing a skid plate for a vehicle.

In another aspect of the present disclosure, as illustrated in FIG. 6, a method 100 of providing a skid plate 26 for a vehicle 10 includes: providing a first layer 30 of the skid plate 26, including a first material $M_1$, 110; providing a second layer 32 of the skid plate 26, including a second material $M_2$, wherein the second layer 32 is bonded to the first layer 30, 120; installing the skid plate 26 between at least one underbody component 18 of the vehicle 10 and a driving surface 14, such that second layer 32 of the skid plate 26 converts a concentrated load $L_C$, applied to the first layer, into a distributed load $L_D$, 130.

Providing a first layer 30 includes providing a first layer 30 that is metallic, 115.

Providing a second layer 32 includes providing a second layer 32 that is a rigid foam, 125. The provided second layer 32 provides thermal insulation for at least one underbody component 18 of the vehicle 10.

The second layer 32 provided includes a thickness T that provides a buffer 38 between a deformation 36 of the first layer 30 and the at least one underbody component 18.

The method of providing a skid plate 26 for a vehicle 10 includes compressing the second layer 32 to absorb energy associated with a contact 40 to the first layer 30 when the concentrated load $L_C$ exceeds a predetermined load $L_D$, 127.

Installing the skid plate 26 between at least one underbody component 18 and a driving surface 14 includes installing the skid plate 26 such that the second layer 32 is adjacent to and/or conforms to the at least one underbody component 18, 135.

It should be appreciated that by utilizing a rigid foam as the second layer bonded to a metallic first layer, as discussed above, the skid plate provides increased physical protection for underbody components by distributing the concentrated load through the second layer, and thermal insulation to protect underbody components, such as a propulsion battery pack, from excessive heat and cold.

It should also be appreciated that by utilizing the disclosed two layer skid plate, an amount of material needed for the skid plate, may be reduced.

As used herein, a system, apparatus, structure, article, element, component, or hardware "configured to" perform a specified function is indeed capable of performing the specified function without alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to", "operative to" and/or as being "operable to" perform that function.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

What is claimed is:

1. A vehicle including a skid plate and at least one underbody component attached adjacent to the skid plate,
   wherein the skid plate comprises
   a first layer that is metallic; and
   a second layer that is a rigid polymeric foam, adhesively bonded to the first layer via an adhesive layer which is disposed between the first and second layers;
   wherein the second layer converts a concentrated load, applied to the first layer, into a distributed load, and wherein the second layer provides thermal insulation for the at least one underbody component, and
   wherein the at least one underbody component includes a propulsion battery pack arranged in direct contact with the second layer of the skid plate.

2. The vehicle as recited in claim 1, wherein the rigid polymeric foam includes an expanding adhesive foam.

3. The vehicle as recited in claim 1 wherein the concentrated load corresponds with a contact to the first layer of the skid plate.

4. The vehicle as recited in claim 3, wherein, when the concentrated load exceeds a predetermined load, the second layer is compressible to absorb energy associated with the contact to the first layer of the skid plate.

5. The vehicle as recited in claim 1, wherein the second layer includes a thickness such that when the first layer includes a deformation, the thickness of the second layer provides a buffer between the deformation of the first layer and the at least one underbody component of the vehicle.

6. A method of forming a vehicle including a skid plate and at least one underbody component attached adjacent to the skid plate, the method comprising:
   providing the at least one underbody component of the vehicle comprising a propulsion battery pack;
   providing the skid plate comprising a first layer that is metallic; and a second layer that is a rigid polymeric foam, adhesively bonded to the first layer via an adhesive layer which is disposed between the first and second layers;
   installing the skid plate between the propulsion battery pack and a driving surface of the vehicle such that the propulsion battery pack is arranged in direct contact with the second layer of the skid plate;
   wherein the second layer converts a concentrated load, applied to the first layer, to a distributed load, wherein the second layer provides thermal insulation for the at least one underbody component.

7. The method as recited in claim 6, wherein a thickness of the second layer provides a buffer between a deformation of the first layer and the at least one underbody component.

8. The method as recited in claim 6, including compressing the second layer to absorb energy associated with a contact to the first layer when the concentrated load exceeds a predetermined load.

* * * * *